United States Patent

[11] 3,607,997

[72] Inventor Patrick John Linturn
 Ilford, Essex, England
[21] Appl. No. 747,446
[22] Filed July 25, 1968
[45] Patented Sept. 21, 1971
[73] Assignee Ilford Limited
 Ilford, Essex, England
[32] Priority July 31, 1967
[33] Great Britain
[31] 35030/67

[54] METHOD FOR PRODUCING AN X-RAY INTENSIFYING SCREEN
 3 Claims, No Drawings

[52] U.S. Cl. ................................................ 264/21,
 117/33.5 C, 117/72, 117/239, 264/245, 264/255
[51] Int. Cl. ........................................................ H01j 29/28
[50] Field of Search ............................................ 117/33.5 C,
 239, 72; 264/21, 245, 255

[56] References Cited
 UNITED STATES PATENTS
 3,389,030 6/1968 Mepham ...................... 117/33.5 X

*Primary Examiner*—Alfred L. Leavitt
*Assistant Examiner*—Wayne F. Cyron
*Attorney*—Cushman, Darby & Cushman ABSTRACT: This application describes a method for the production of a self-supporting plastic-material film assembly which comprises coating onto a casting surface a thin layer of a solution of plastic material or a plurality of superimposed thin layers of solutions of plastic materials, each layer being dried before any subsequent layer is applied, the improvement which comprises coating on the dried top layer of plastic material a relatively thick layer of a plastisol, heating this layer to solidify the plastisol and removing the thus prepared film assembly from the casting surface, each layer of the assembly being selected so as to be strongly adherent in the product to the layer or layers with which it is in contact.

METHOD FOR PRODUCING AN X-RAY INTENSIFYING SCREEN

This invention relates to the production of self-supporting plastic-material film assemblies.

The term film assembly as used herein means at least two film layers or laminae which adhere together. A self-supporting film assembly means an assembly which is sufficiently resilient to prevent the assembly from wrinkling and creasing when handled and which can be maintained without difficulty in a completely flat state. A self-supporting plastic material film assembly usually comprises a so-called support base of a resilient plastic material which has adherent thereto a thinner lamina of plastic material which very often contains coloring matter or which has dispersed therein pigments, e.g. titanium dioxide, or granular material, e.g. magnetic oxide or phosphors. Such thinner film laminae are usually not sufficiently resilient to be self-supporting and therefore they are required to be carried on a support base of thicker and more resilient material before they can be used. Sometimes the thinner film lamina will adhere directly onto the support base but often an adhesive or subbing layer is required between the two laminae for proper adhesion. The usual method of preparing self-supporting plastic-material film assemblies is to cast the support base as film material and then to coat onto this base the thinner layer if it will adhere directly thereto or to coat onto the base a subbing layer and then to coat the thinner lamina onto this subbing layer. Another method is to cast both laminae separately and then to bond them together using heat and pressure.

It is the object of the present invention to provide a new method of preparing a self-supporting plastic-material film assembly.

According to the present invention there is provided a method for the production of a self-supporting plastic-material film assembly which comprises coating onto a casting surface a thin layer of a solution of plastic material or a plurality of superimposed thin layers of solutions of plastic materials, each layer being dried before any subsequent layer is applied, and then coating on the dried top layer of plastic material a relatively thick layer of a plastisol, heating this layer to solidify the plastisol and removing the thus prepared film assembly from the casting surface, each layer of the assembly being selected so as to be strongly adherent in the product to the layer or layers with which it is in contact.

The term "plastisol" as used herein refers to a liquid resin system which comprises small particles of a plastic material dispersed in a liquid plasticizer therefor, but in which at normal temperatures the plastic material is not soluble. When such a liquid resin system is heated the particles of plastic material dissolve in the plasticizer and the mixture solidifies. Thus when a plastisol is heated it irreversibly changes into a solid. It is one of the advantages of the present invention that there are no volatile solvents in the plastisol so that a 10 thousandth of an inch layer of a plastisol is coated and then heated, approximately a 10 thousandth of an inch layer of plastic film material is obtained. It is possible to obtain without difficulty a thick uniform layer of plastic material in one coating.

It is preferred that the relatively thick layer of plastisol is at least 5 thousandths of an inch thick, that is to say thick enough to act as a resilient support base.

The most easily available plastisols are based on polyvinyl chloride; in the liquid state such plastisols may comprise a dispersion of polyvinyl chloride in a plasticizer such as dibutyl phthalate.

A particular use of the process of the present invention is in the production of X-ray intensifying screens. X-ray intensifying screens comprise particles of so-called phosphors such as calcium tungstate or barium or lead sulfate in a binder on a support base. In the past the support base used was generally cardboard but this resulted in a very brittle screen. More recently the support base used has been a plastic material such as a relatively thick sheet of orientated polyethylene terephthalate, however such a base is expensive. By the use of the present invention a strong, dimensionally stable X-ray intensifying screen may be economically prepared.

The following Example will serve to illustrate the invention.

EXAMPLE

On to a casting surface which consisted of baryta filled 135/m.² paper base was coated the following plastic material solution:

| Cellulose acetate | 100 g. |
|---|---|
| Acetone 756 g. | |
| Diethyl phthalate | 10 g. |
| Ethyl lactate | 45 g. |
| Ethyl acetate | 76 g. |
| Industrial Methylated Spirit | 13 g. |

After drying a coating of 0.001 inch thickness was obtained.

The following solution of plastic material containing the phosphor calcium tungstate intimately dispersed therein was then coated on the dried cellulose acetate layer.

| Cellulose acetate butyrate | 100 g. |
|---|---|
| Acetone | 700 mls. |
| Toluene | 300 mls. |
| Ethyl alcohol (Absolute) | 340 mls. |
| Dibutyl phthalate | 100 mls. |

After drying a coating of 0.007 thickness was obtained.

The following solution of plastic material containing $TiO_2$ as a pigment was then coated onto the dried cellulose acetate/butyrate layer.

| $TiO_2$ | 27.27 g. |
|---|---|
| Ethyl alcohol (Absolute) | 32.73 g. |
| Cellulose acetate butyrate | 9.14 g. |
| Ethyl acetate | 5.52 g. |
| Toluene | 15.81 g. |
| Dibutyl phthalate | 9.53 g. |
| | 100 g. |

After drying a coating of 0.0015 inch was obtained.

Onto this layer was then coated a layer, 0.014 inch thick, of the polyvinyl chloride based plastisol marketed by Vinatex Limited. The assembly was then heated to 190° C. whereon the plastisol solidified. After cooling, the assembly was removed from the casting surface and trimmed to the required dimensions. The resulting film assembly was fully self-supporting and could be bent without any delamination or cracking of the surface. The film-assembly as made above was used in the normal way as an X-ray intensifying screen. It comprised, as made above, (a) a protective layer composed essentially of cellulose acetate, this layer also acted as a stripping layer and enabled the assembly to be stripped very easily from the casting surface, (b) a phosphor-containing layer composed of calcium tungstate particles dispersed in cellulose acetate butyrate, (c) a reflecting layer, this layer containing titanium dioxide particles dispersed therein which serve to reflect back light from the phosphors, and (d) a support base composed essentially of polyvinyl chloride.

An adhesive layer is sometimes included, being coated on top of the reflecting layer (c) to promote better adhesion of the plastisol layer (d).

An X-ray intensifying screen may be constructed excluding the reflecting layer (c), provided that the plastisol is sufficiently light reflecting by virtue of its own pigmentation. In this case, the adhesive layer, if required, may be coated directly onto the phosphor containing layer prior to the coating of the plastisol.

In the above Example the binder material used for the phosphor was cellulose acetate/butyrate. It has been found that equally good binders are the so-called acrylic polymers. Examples of acrylic polymers are polymethyl acrylate, polyethyl acrylate, N-butyl methacrylate, nonyl methacrylate and polycellosolve methacrylate. Acrylic polymers are good binders for phosphors and adhere well to the other layers present in the X-ray screen described above.

I claim as my invention:

1. In a method for the production of an X-ray intensifying screen, which is a self-supporting plastic film assembly, which comprises coating onto a casting surface a plurality of superimposed thin layers of solutions of plastic materials, one layer of which comprises phosphors and another layer of which comprises a reflecting pigment, each layer being dried before any subsequent layer is applied, the improvement which comprises coating on the dried top layer of plastic material a single layer of plastisol of at least five thousandths of an inch thick, heating this layer to solidify the plastisol and removing the thus prepared X-ray intensifying screen from the casting surface, each layer of the screen being selected so as to be strongly adherent in the product to the layer or layers with which it is in contact.

2. A method according to claim 1 wherein the plastisol is a dispersion of polyvinyl chloride in dibutyl phthalate.

3. A method according to claim 1 wherein the plastisol is a polyvinyl chloride plastisol and the layers of plastic material contain either a coloring matter, pigment, magnetic oxide or phosphor.